United States Patent [19]
Raghunathan et al.

[11] Patent Number: 5,831,864
[45] Date of Patent: Nov. 3, 1998

[54] DESIGN TOOLS FOR HIGH-LEVEL SYNTHESIS OF A LOW-POWER DATA PATH

[75] Inventors: Anand Raghunathan; Niraj K. Jha, both of Princeton, N.J.

[73] Assignee: Trustees of Princeton University, Princeton, N.J.

[21] Appl. No.: 741,826

[22] Filed: Oct. 31, 1996

[51] Int. Cl.$^6$ .................................................. G06F 17/50
[52] U.S. Cl. .......................................... 364/488; 364/491
[58] Field of Search ................................... 364/488, 489, 364/490, 491, 578

[56] References Cited

U.S. PATENT DOCUMENTS

| | | | |
|---|---|---|---|
| 5,550,749 | 8/1996 | Dey et al. | 364/489 |
| 5,557,531 | 9/1996 | Rostoker et al. | 364/489 |
| 5,673,200 | 9/1997 | Toyonaga et al. | 364/490 |
| 5,696,694 | 12/1997 | Khouja et al. | 364/488 |
| 5,706,205 | 1/1998 | Masuda et al. | 364/489 |

OTHER PUBLICATIONS

Raghunathan, Anand and Jha, Niraj K., "An Iterative Improvement Algorithm for Low Power Data Path Synthesis," *Proc. IEEE Int'l Conference on Computer–Aided Design* (Nov. 1995).

Chaudhuri, Samit, et al., "An Exact Methodology for Scheduling in a 3D Design Space," *Proc. Int. Symp.System Level Synthesis*, pp. 78–83 (Jun. 1995).

Landman, Paul E. and Rabaey, Jan M., "Architectural Power Analysis: The Dual Bit Type Method," *IEEE Trans. VLSI Systems*, pp. 173–187 (Jun. 1995).

Raghunathan, Anand, and Jha, Niraj K., "An ILP formulation for low power based on minimizing switched capacitance during data path allocation," *Proc. Int'l Symp. Circuits & Systems*, pp. 1069–1073 (May 1995).

Chandrakasan, Anantha P., et al., "Optimizing Power Using Transformations," *IEEE Trans. Computer–aided Design*, pp. 12–31 (Jan. 1995).

Goodby, Laurence, et al., "Microarchitectural Synthesis of Performance–Constrained, Low–Power VLSI Designs," *Proc. Int'l Conf. Computer Design*, pp. 323–326 (Oct. 1994).

Raghunathan, Anand, and Jha, Niraj K., "Behavioral Synthesis for Low Power," *Proc. Int'l Conf. Computer Design*, pp. 318–322 (Oct. 1994).

Mehra, Renu, and Rabaey, Jan, "Behavioral Level Power Estimation and Exploration," *Proc. Int's Workshop Low Power Design*, pp. 197–202 (Apr. 1994).

Park, In–Cheol, and Kyung, Chong–Min, "FAMOS: An Efficient Scheduling Algorithm for High–Level Synthesis," *IEEE Trans. on Computer–Aided Design of Int'l Circuits & Sys.*, pp. 1437–1448 (Oct. 1993).

Chandrakasan, Anantha P., Sheng, Samuel and Brodersen, Robert W., "Low–Power CMOS Digital Design," *IEEE J. Solid–State Circuits*, pp. 473–484 (Apr. 1992).

Liou, Ming, "Overview of the px64 kbit/s Video Coding Standard," *Communications of the ACM*, pp. 60–63 (Apr. 1991).

McFarland, Michael C., et al., "The High–Level Synthesis of Digital Systems," *Proc. IEEE*, pp. 301–318 (Feb. 1990).

Papadimitriou, C.H., *Combinatorial Optimization: Algorithms and Complexity*, pp. 454–481 (1982).

Primary Examiner—Kevin J. Teska
Assistant Examiner—Leigh Marie Garbowski
Attorney, Agent, or Firm—Louis J. Hoffman

[57] ABSTRACT

A computer-aided design tool and associated methods address the problem of high-level behavioral synthesis, useful in the design of semiconductor integrated circuit for minimum power consumption. The tool makes a plurality of types of power reducing changes, and evaluates the results using iterative improvement. In a particular embodiment, "moves" corresponding to alterations of scheduling of operations or resource sharing are iteratively proposed and evaluated with a power "cost function" defined by summing estimates of the switched capacitance of each resource element. In an extension of that embodiment, moves corresponding to alterations of module selection and clock selection are also evaluated.

15 Claims, 8 Drawing Sheets

Microfiche Appendix Included
(3 Microfiche, 214 Pages)

```
SCALP (CDFG G, Sample Period T_s , Library L ) {
   V_min ← ESTIMATE_MIN_VOLTAGE( G,T_s,L);
   V_max ← 5Volts;
   Best_DP ← φ;
   Cur_DP ← φ;
   for (V_dd ← V_min; V_dd ≤ V_max; V_dd ← V_dd +ΔV) {
      if(VDD_PRUNE (G,Cur_DP,V_dd )) {
         continue; (* move on to next V_dd *)
      }
      for (csteps ← MAX_CSTEPS;
            csteps ≥ MIN_CSTEPS; csteps ← csteps-1){
         if(CLK_PRUNE (G,L,csteps)) {
            continue; (*move on to next clock*)
         }
         (*minimum switched capacitance data path*)
         (*for the current V_dd and csteps *)
         Cur_DP ← INITIAL_SOLUTION (G,L, V_dd, csteps);
         ITERATIVE_IMPROVEMENT (G,L, Cur_DP);
         if (POWER_EST (Cur_DP) < POWER_EST (Best_DP)) {
            Best_DP ← Cur_DP;
         }
      }
   }
}
```

FIG. 2

```
Proceedure ITERATIVE_IMPROVEMENT(CDFG G, Library L,
                                 Datapath DP) {
   do {
      for (l=1; l ≤ MAX_MOVES; l = l +1) {
         Gain_l ← GENERATE_MOVE (G, L, DP);
         Append Gain_l, to Gain_List;
      }
      Find subsequence, Gain_i ... Gain_k in Gain_List so
      that G = $\sum_{i=1}^{k}$ Gain_i is maximized:
      if (G>0) {
         Accept moves 1...k;
      }
   } until (G ≤ 0);
}
```

FIG. 4

DESIGN TOOLS FOR HIGH-LEVEL SYNTHESIS OF A LOW-POWER DATA PATH

MICROFICHE APPENDIX

A microfiche appendix containing computer source code is included in this application, consisting of three sheets of microfiche having 214 total frames.

The computer source code in the microfiche appendix is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

A computer-aided design tool and associated methods aid in the problem of designing a semiconductor integrated circuit (or a system comprised of several integrated circuits) for minimum power consumption, a quality that is important in certain applications, notably for chips used in portable devices such as laptop computers. The inventive design tool addresses the problem of high-level (or behavioral) synthesis.

BACKGROUND OF THE INVENTION

Synthesis of digital circuits has been the subject of some study. The overall problem is to design a data path that implements a given behavioral specification (that is, a mapping from inputs to outputs) while satisfying a set of goals and constraints. The behavioral specification may be expressed as a control-dataflow graph (CDFG), which is a directed graph having vertices that represent operators or control flow constructs and edges that represent data or control dependencies between operators. An example CDFG is shown in FIG. 1, which is a CDFG representing the computation of the dot product of two vectors.

High-level synthesis refers to the synthesis of a register-transfer level structure that realizes the given behavior. Such a structure is characterized by a set of registers, multiplexers, ALU's, or other functional units or modules, with specified inter-connections. Once a register-transfer level structure is synthesized, known design tools can assist in creating logic- and circuit-level designs, including cell and transistor layouts. That process can be referenced as "low-level synthesis."

Heretofore, high-level synthesis has pursued the twin goals of maximizing the speed of the circuit or minimizing the area containing the circuit layout. A survey article describing work in the field of high-level synthesis is McFarland et al., "The High Level Synthesis of Digital Systems," *IEEE Proc.*, pp. 301-18 (Feb. 1990), and is hereby incorporated by reference. McFarland et al. identify a variety of earlier papers and design tools in the field.

In the past few years, it has been recognized that high-level synthesis can have an important effect on the power consumption of a circuit. Behavioral synthesis tasks such as module selection, clock selection, scheduling, allocation, and assignment, for example (these are described more fully below), can impact power consumption. Scholarly papers such as the following have discussed those relationships and are hereby incorporated by reference: (1) Chandrakasan et al., "Low-Power CMOS Digital Design," *IEEE J. Solid-State Circuits*, pp. 473-84 (Apr. 1992); (2) Chandrakasan et al., "Optimizing Power Using Transformations," *IEEE Trans. Computer-aided Design*, pp. 12–31 (Jan. 1995); (3) Mehra et al. "Behavioral Level Power Estimation & Exploration," *Proc. Int'l Workshop Low Power Design*, pp. 197–202 (Apr. 1994); (4) Goodby et al., "Microarchitectural Synthesis of Performance-Constrained, Low-Power VLSI Designs," *Proc. Int'l Conf. Computer Design*, pp. 323-26 (Oct. 1994); (5) Raghunathan & Jha, "Behavioral Synthesis for Low Power," *Proc. Int'l Conf. Computer Design*, pp. 318-22 (Oct. 1994); and (6) Raghunathan & Jha, "An ILP Foundation for Low Power Based on Minimizing Switched Capacitance During Datapath Allocation," *Proc. Int'l Symp. Circuits & Systems* pp. 1069-73 (May 1995).

However, the theoretical work on high-level synthesis for low-power has not in general resulted in useful design tools.

In part, the lack of useful design tools arises from the complex nature of power as a cost function. The average switching power of a gate, which accounts for the dominant part of power consumption in CMOS technology, is given by the equation:

$$0.5 C_L V_{dd}^2 N/T, \qquad (1)$$

where $C_L$ is the gate output capacitance, $V_{dd}$ is the supply voltage, and N is the number of transitions at the gate output during the period of operation T. The equation for power consumption implies that the supply voltage, $V_{dd}$, has a strong effect on power consumption because of its quadratic contribution.

An unfortunate side-effect of decreasing $V_{dd}$, however, is that the delay of the circuit increases. The delay of a CMOS gate can be shown to be $$k(C_L V_{dd})/(V_{dd} - V_{th})^2, \qquad (2)$$

where $V_{th}$ is the device threshold voltage, and k is a constant that depends on the technology and the size of transistors in the gate. Hence, $V_{dd}$ scaling is only performed when the delay degradation does not cause the delay to exceed the specified constraint, or when other means are used to combat the delay degradation. The product of the physical capacitance, $C_L$, and the transition activity, N/T, is called the switched capacitance. The effect of the switched-capacitance term, though not as drastic as the supply voltage term, can also be used to reduce power consumption.

There is a need in the industry for a practical design tool that can perform high-level synthesis tasks to achieve low-power consumption, while accounting for the interdependence of the tasks. In conjunction with known layout tools, such a high-level design aid can permit fully aided layout for power optimization.

There is also a need to consider simultaneously the effects of several behavioral synthesis tasks like module selection, clock selection, scheduling, and resource sharing on supply voltage and switched capacitance, to fully derive the benefits of design space exploration at the behavior level.

It is, therefore, a primary object of the invention to provide a computerized design aid for high-level data path synthesis for low-power applications.

It is another object of the invention to provide systems and methods for designing circuits to minimize power consumption.

It is another object of the invention to provide systems and methods for performing two or more high-level synthesis tasks while accounting for the interdependence therebetween.

It is another object of the invention to provide systems and methods for simultaneously optimizing two or more high-level synthesis factors with respect to low-power consumption.

It is another object of the invention to reduce the power consumption in the synthesized data path by performing scheduling, clock selection, module selection, and resource allocation, and assignment simultaneously.

It is another object of the invention to provide a computer-readable storage or memory device or circuit whose structure is defined by a computer program that can cause a computer operating pursuant to the program to recommend a solution for high-level synthesis of a data path that minimizes power consumption of a circuit designed in accordance with the recommended solution.

It is another object of the invention to provide a computer process, implemented using a computer program, for selecting a register-transfer level structure for a circuit that realizes a given behavior with minimum power consumption.

SUMMARY OF THE INVENTION

The inventive system achieves the above objects and other objects of the invention as may be apparent from review of the detailed description below, by providing apparatus and methods that can be used as a high-level synthesis tool for selecting a low-power solution implementing a data path from among the various combinations of modules possible by making two or more types of power reducing changes, and evaluating the results using iterative improvement.

In a particular embodiment, "moves" corresponding to alterations of scheduling of operations or resource sharing are iteratively proposed and evaluated with a power "cost function" defined by summing estimates of the switched capacitance of each resource element. In an extension of that embodiment, moves corresponding to alterations of module selection and clock selection are also evaluated. When additional interactions fail to produce further power reductions, the tool proposes the lowest power combination previously evaluated.

Other aspects of the invention will be appreciated by those skilled in the art after a reading of the detailed disclosure of the present invention below.

BRIEF DESCRIPTION OF THE DRAWINGS

FIG. 2 is pseudo-code summarizing a preferred implementation of the invention.

FIG. 4 is a pseudo-code of an iterative improvement method in accordance with the invention.

Common numerals are used in the several figures to indicate similar elements.

DETAILED DESCRIPTION

Figure 1:
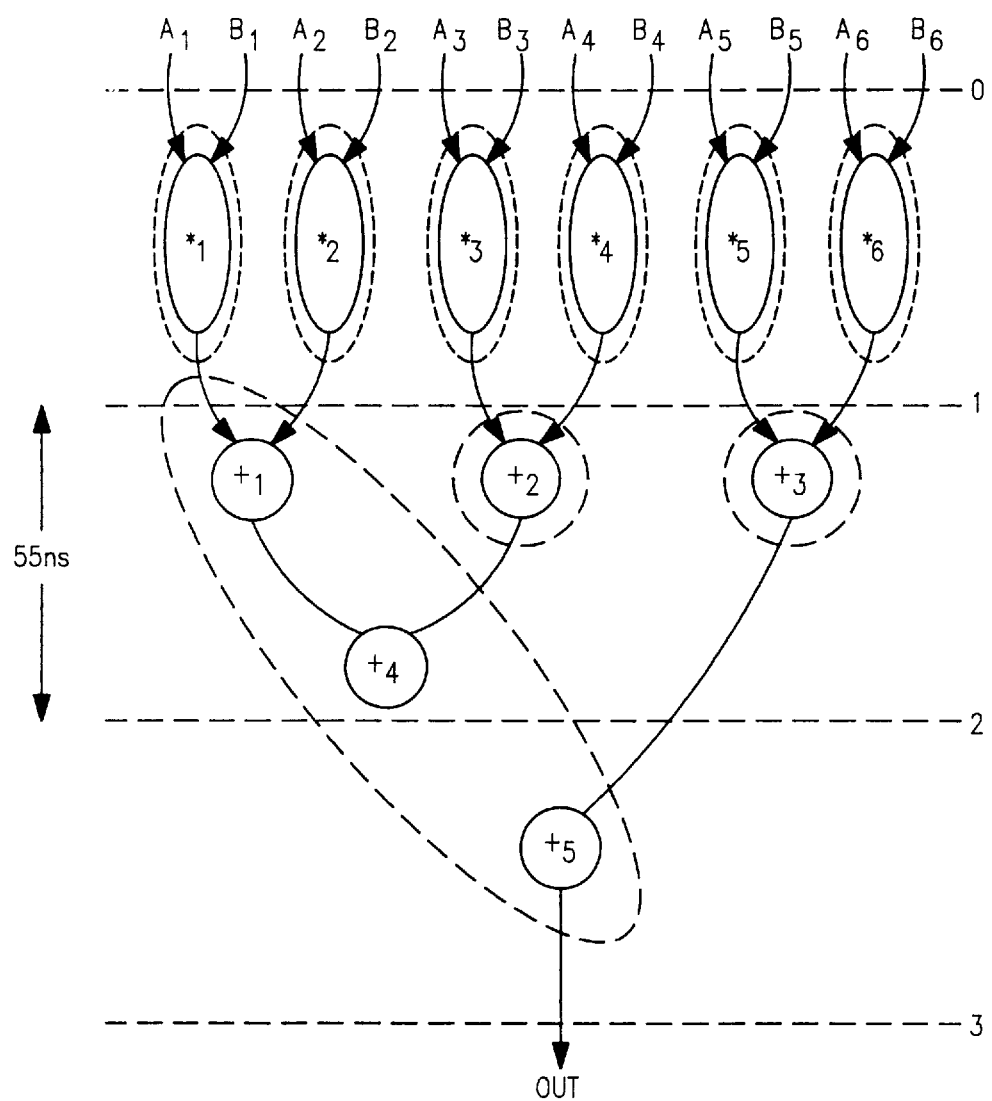
FIG. 1 is an example CDFG representing the computation of the dot product of two vectors.

The inventive method, which is based on an iterative improvement strategy, is capable of escaping local minima in its search for a low-power solution. The preferred embodiment considers diverse module libraries and complex scheduling constructs such as multicycling, chaining, and structural pipelining.

In a preferred embodiment, supply voltage and clock pruning strategies described below can significantly improve the efficiency of the calculation by cutting down on the computational effort involved in exploring candidate supply voltages and clock periods that are unlikely to lead to the best solution.

This invention focuses on data-dominated behavioral descriptions, as are common in digital signal and image processing applications. Two important characteristics of such descriptions are: (i) they consist mainly of arithmetic operations like addition, multiplication, and delay operators, etc., and (ii) there is a constraint on the input sampling period, i.e., the inputs arrive at a fixed rate. It is necessary to be able to process an input sample before the next one arrives. However, it does not pay to process input samples any faster than the required rate.

A number of changes to a circuit can be made to alter power consumption Power reduction can be achieved by incorporating those changes into the iterative improvement framework described herein. Several of these are described below, in connection with the figures. In all, the following types of changes, called power-reducing transformations are known:

(a) Assignment (resource sharing/splitting)
(b) Module selection
(c) Clock and voltage selection
(d) Data path replication
(e) CDFG transformations The final two changes are described in the above-incorporated literature (particularly the references cited above as (1) and (2) discussing data path replication and CDFG transformations), and detailed descriptions are omitted here, as they are known to the ordinarily skilled artisan. In addition, another transformation, scheduling, does not reduce power directly, but can permit implementation of other power-reducing transformations, as explained below.

To fully explore the design space, it is necessary to have a diverse library of functional unit templates where multiple templates exist that are capable of performing each operation (e.g., ripple carry adder, carry lookahead adder, and carry select adder for addition, array multiplier, Wallace tree multiplier, and pipelined multiplier for multiplication, etc.).

In the inventive system, each of the functional unit templates in the library is characterized by power cost estimates. In a preferred embodiment, the power cost is modeled by a switched capacitance matrix. Given a pair of input vectors, the capacitance switched in the functional unit, upon the application of the given input vector pair, can be calculated. This model is abstracted into a procedure, SW_CAP(), which can be implemented either using a stochastic power analysis model or by invoking a gate- or switch-level simulator on an appropriate netlist (if one is available for the given module), to return the exact capacitance switched.

The switched capacitance matrix can be created as follows: A functional simulation of the CDFG is performed, with an input sequence that is either provided by the user or generated based on known input characteristics. As the functional simulation is performed, a data structure (the switched capacitance matrix) is updated using the values taken by variables in the CDFG and procedure SW_CAP(). Switched capacitance matrices associate a switched capacitance cost to each pair of operations that could be mapped to the same resource. A separate switched capacitance matrix is created for each functional unit template that exists in the library. For example, consider the functional unit template, ripple carry adder, and addition operations, +i and +j. If +i and +j share the same ripple carry adder in such a way that the adder performs +i immediately followed by +j, the operands to +i and +j effectively form an input vector pair to the adder. This input vector pair is used to update the switched capacitance matrix entry.

At the end of this data collection process, a switched capacitance matrix exists for each functional unit template t, having entries that indicate, for each pair of operations, the cost in terms of switched capacitance if the operations are both mapped to the same instance of template t. Similarly, switched capacitance matrices are also used to estimate switched capacitance in registers and interconnection units.

Different candidate architectures can be evaluated with respect to their switched capacitance by using the entries in the switched capacitance matrices.

Scheduling, clock selection, module selection, and resource sharing interact in a complex way to determine the power consumption of the data path. Because the computational complexity of the power minimization problem forbids an exact or optimal solution, an efficient heuristic method for performing the above tasks for minimizing power consumption is described. Although the preferred method targets both $V_{dd}$ scaling and switched capacitance reduction, both are not believed required to achieve valuable results in an inventive system and method.

Figure 3:
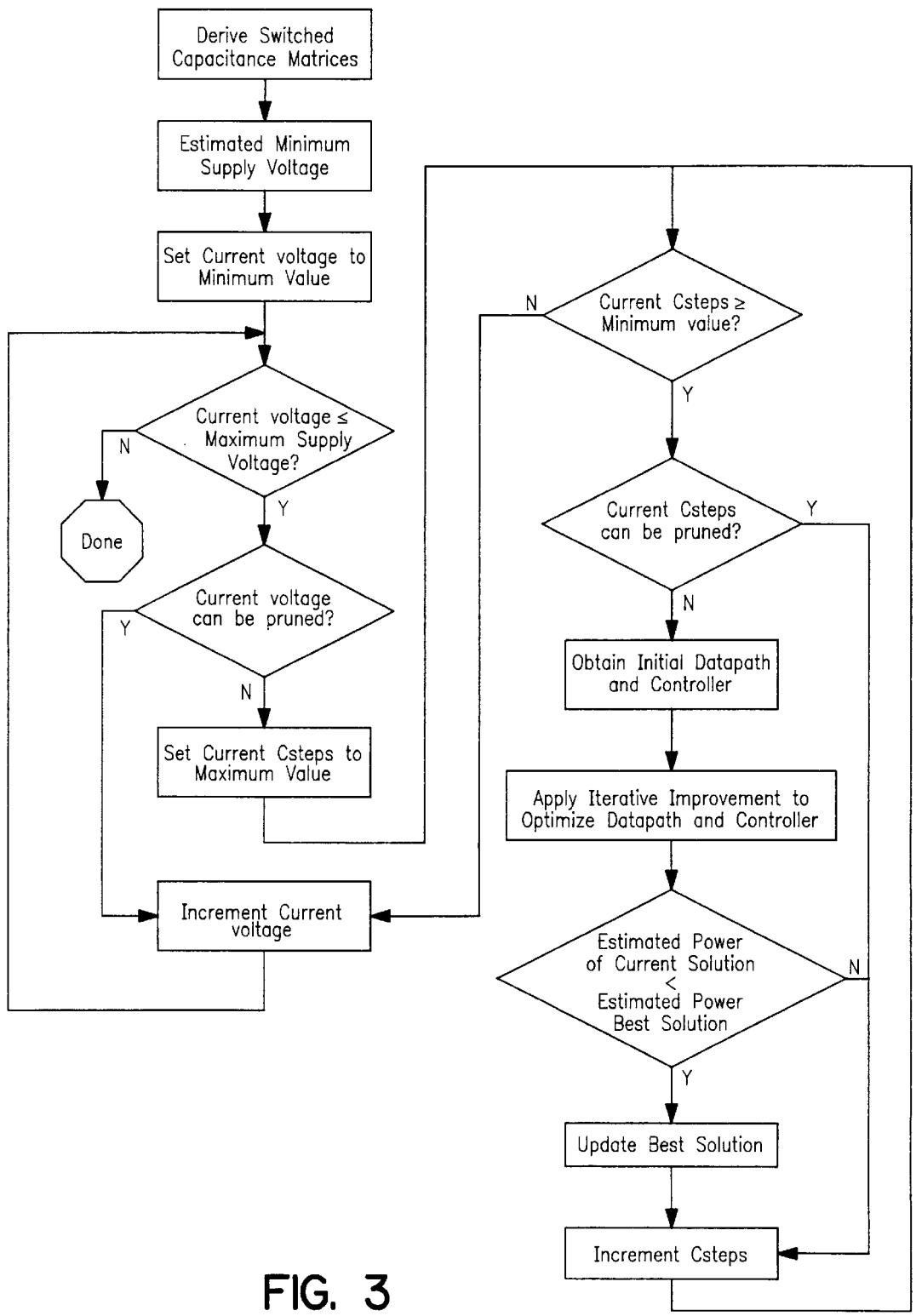
FIG. 3 is a flowchart summarizing the preferred implementation.

The pseudo-code in FIG. 2 and the flowchart of FIG. 3 summarize the method. First, the procedure ESTIMATE_MIN_VOLTAGE() is called to estimate the minimum voltage, $V_{min}$, at which a given CDFG can be implemented. The voltage interval between $V_{min}$ and $V_{max}$ (5V) is discretized in steps of a suitable increment, which could be specified by the user as a parameter.

The techniques explained below are used to prune the $V_{dd}$ space significantly. For supply voltages that cannot be pruned, the procedure moves on to examine various values for the number of control steps, csteps (or equivalently, various values for the system clock period). Again, it turns out that several candidate clock periods can be easily pruned, using the method explained below.

For those combinations of $V_{dd}$ and csteps that cannot be pruned, an initial implementation is generated that satisfies the sample period constraint, which is then improved by calling procedure ITERATIVE_IMPROVEMENT.

Because this stage of the method attempts data path synthesis for a fixed value of $V_{dd}$ and csteps, the objective is to synthesize a data path that satisfies the sample period constraint at the current $V_{dd}$ and clock period and has minimal switched capacitance. At any time, the best solution (Best_DP) seen thus far is stored. After all the candidate supply voltages and clock periods have been either pruned or explored, Best_DP contains the final solution.

The preferred iterative improvement procedure is based on a general search strategy for optimization problems called variable depth search. Given an initial solution, the system attempts to find a sequence of incremental moves (rather than a single move, as in the case of local search) that maximizes the cumulative improvement in the solution, also called the gain. This process is iterated until no such sequence can be found. Because this class of procedures considers sequences that have a cumulative positive gain even though individual moves may have a negative gain, it is capable of hill-climbing to escape from local minima. At any point, the next move is chosen based on the steepest descent heuristic.

Figure 5:
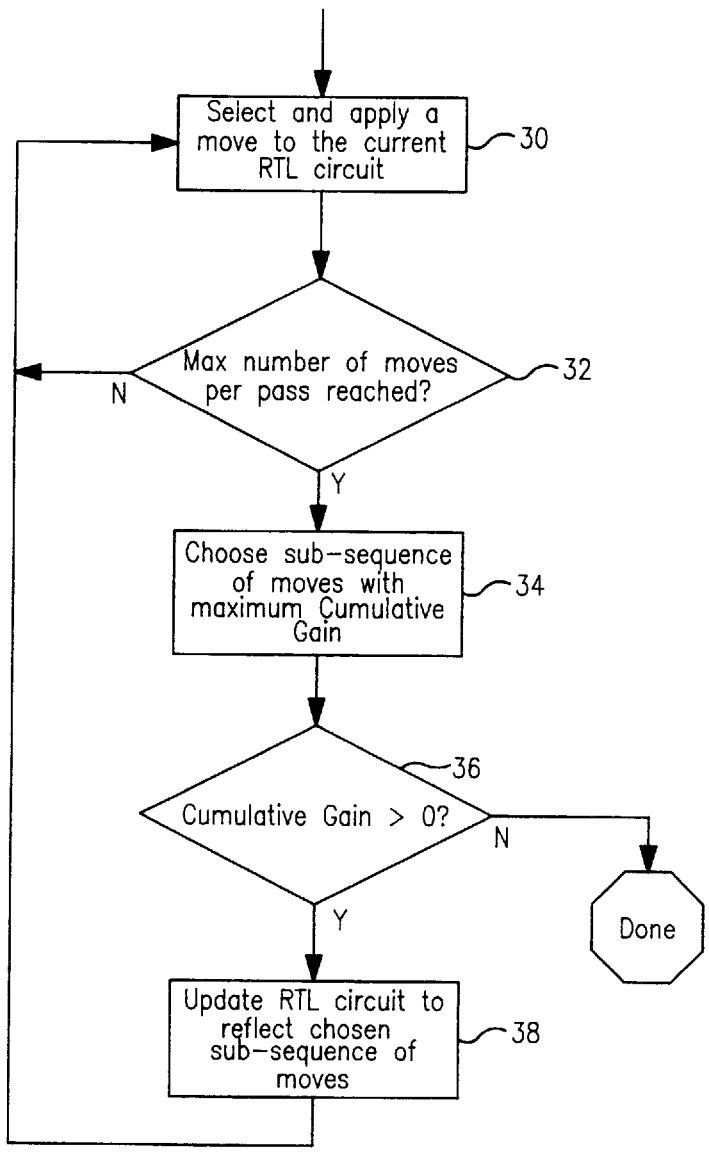
FIG. 5 is a flowchart summarizing the iterative improvement method.

FIG. 4 shows the pseudo-code and FIG. 5 shows a flowchart for a preferred procedure implementing that method, called ITERATIVE_IMPROVEMENT(). The cost function is the switched capacitance in the data path, which is estimated using switched capacitance matrices. As shown FIG. 5, a move is selected (see box 30) from among the classes of defined moves available to the method, as discussed below. The moves can implement any sort of power-reducing transformation to the current circuit available in the embodiment of the invention. However, if module selection or resource sharing are available, scheduling moves must be available as well, for reasons discussed below. Each available class of moves is explored, and the particular move that results in the highest gain (i.e., the greatest decrease in switched capacitance) is the one selected. Note that the variable depth search demands that the highest-gain move be selected, even if that move has a negative gain (i.e., an increase in switched capacitance, because all available moves are worse than the initial state). The process 30 is repeated a selected number of times (32), which may be a user-defined or predetermined parameter, such as MAX_MOVES in FIG. 4. On each repeat, the sub-sequence of previously selected moves have been applied to temporarily alter the circuit from its initial state, and each potential move for that repeat is applied from the altered circuit. The gain in switched capacitance after each temporary alteration, measured from the initial state, is saved along with the number of repeats in the sub-sequence. At the conclusion of the pass, the saved gain numbers are examined, and the intermediate or final result having the highest cumulative gain is identified. This represents the sub-sequence of moves with the maximum cumulative gain, where cumulative gain refers to a comparison between the temporarily altered circuit after n steps and the initial state of the circuit (where $1 \leq n \leq$ MAX_MOVES). The sub-sequence of n moves having the highest cumulative gain is chosen (see box 34 in FIG. 5). If the maximum cumulative gain is non-positive (36), then the variable depth search is complete, because the initial state is the maximum. If, on the other hand, the maximum cumulative gain is positive, then the circuit is updated (38) from the initial state, by applying each of the n moves in the best sub-sequence, in order. In other words, the temporary alteration after n moves is accepted as the initial state of the circuit for the next pass. Additional passes (30–38) are performed until no further cumulative gain is noted.

In a preferred embodiment, moves are defined so as to explore the scheduling, module selection, allocation, and assignment choices available. However, in a basic form of the inventive system and method, moves exploring only the scheduling and resource sharing aspects of the problem are included.

The following key observation allows restriction of the number of distinct types of moves that must be considered: Moves that affect the schedule alone (called rescheduling moves), without causing any change in the module selection or resource sharing, cannot by themselves affect the switched capacitance in the data path. However, such moves cannot be completely eliminated, because they enable the application of other moves that change the module selection or resource sharing. Hence, the inventive system integrates the enabling rescheduling moves with other moves that they enable. Thus, each composite move consists of a change in the module selection or resource sharing, preceded by an enabling rescheduling move, if necessary.

A. Scheduling. The process of scheduling determines the cycle-by-cycle behavior of the CDFG, i.e., it assigns each operation in the CDFG to one or more cycles or control steps. FIG. 1 shows the schedule information for the example CDFG. The horizontal dotted lines labeled with numbers indicate the clock edges, i.e., the boundaries between control steps. Note that operation +4 is scheduled to be executed in the same control step as operations +1 and +2 because the clock period, which is 55 ns, is large enough to permit us to do so. This technique is called chaining. The term multicycling refers to the complementary situation where a single operation requires multiple control steps to execute. Structural pipelining refers to the use of pipelined execution units in the data path.

Clearly, the choice of clock period affects the assignment of control steps to operations, as does the delay of each operation in the CDFG. These values are determined by the clock selection and module selection tasks, respectively, creating an interdependence among scheduling, module selection, and clock selection. Operations (variables) that are active in the same control step must be assigned to different functional units (registers). For example, operations *1 through *6 must all be performed by separate functional units.

Since scheduling affects the rate at which input samples are processed, it also affects the possibilities for reducing $V_{dd}$. On the other hand, scheduling affects switched capacitance because it imposes constraints on the possibilities of resource sharing. The slack, if any, between the sample period constraint and the time taken by an implementation for processing input samples has been commonly exploited to reduce power consumption using $V_{dd}$ scaling, as illustrated below.

EXAMPLE 1

Suppose the given sample period constraint for the example CDFG shown in FIG. 1 is 200 ns. The clock period for the schedule shown in FIG. 1 is 55 ns. Since the schedule has three control steps, processing each input sample requires 165 ns. Suppose the clock period was chosen based on delay numbers for $V_{dd}$=5V. All multiplications in the CDFG of FIG. 1 are assumed to be performed by functional unit instances of the template, array multiplier, whereas all additions are assumed to be performed by functional unit instances of the type ripple carry adder. Dotted lines have been used to group operations that are performed by the same functional unit. Since the given schedule processes input samples faster than required, this surplus performance is exploited to reduce $V_{dd}$ until the time required for one iteration of the CDFG becomes 200 ns, i.e., the sample period constraint is just met. This is determined using a curve or equation that models the $V_{dd}$-delay relationship. In this case, it is possible to reduce $V_{dd}$ to 4.0V and still meet the 200 ns constraint.

The extent of the slack that is available depends on the constraints imposed by the environment, as illustrated by the next example.

EXAMPLE 2

Let us consider an image that has 288×360 pixels as per the CIF standard. Consider the task of performing a discrete cosine transform (DCT) on the luminance information of each pixel. A commonly used approach is to divide up the image into blocks, say of 8×8 pixels, and perform a DCT on each block separately. Each 8×8 block thus obtained now requires a two-dimensional DCT, which can be further broken down into 16 one-dimensional 8-point DCT operations. The number of one dimensional 8-point DCTs required to process one frame is thus calculated to be 25,920. Thus, to process 30 frames/sec., a system would need to perform each DCT in about 1,286 ns.

The term laxity factor of a data path that implements a given CDFG is defined as the ratio of the given sample period constraint to the actual execution time of the data path for one iteration. For the above example, assuming that an implementation of an 8-point one-dimensional DCT takes 500 ns to process each set of inputs, then the laxity factor available is 2.57. A higher laxity factor permits us to perform more $V_{dd}$ scaling and hence results in greater power savings.

It is possible to use various methods to speed up the execution of the CDFG and make use of the slack thus obtained to scale $V_{dd}$ until the sample period constraint is just met. A consequence of these speedup techniques is that the switched capacitance per execution of the CDFG typically increases. This may be due to the use of faster functional units that contribute a higher switched capacitance per operation, or due to the constraints imposed by the tighter schedule on the possibilities for resource sharing. Thus, there exists a $V_{dd}$-versus-switched-capacitance tradeoff that is illustrated by the example below.

EXAMPLE 3

Figure 6:
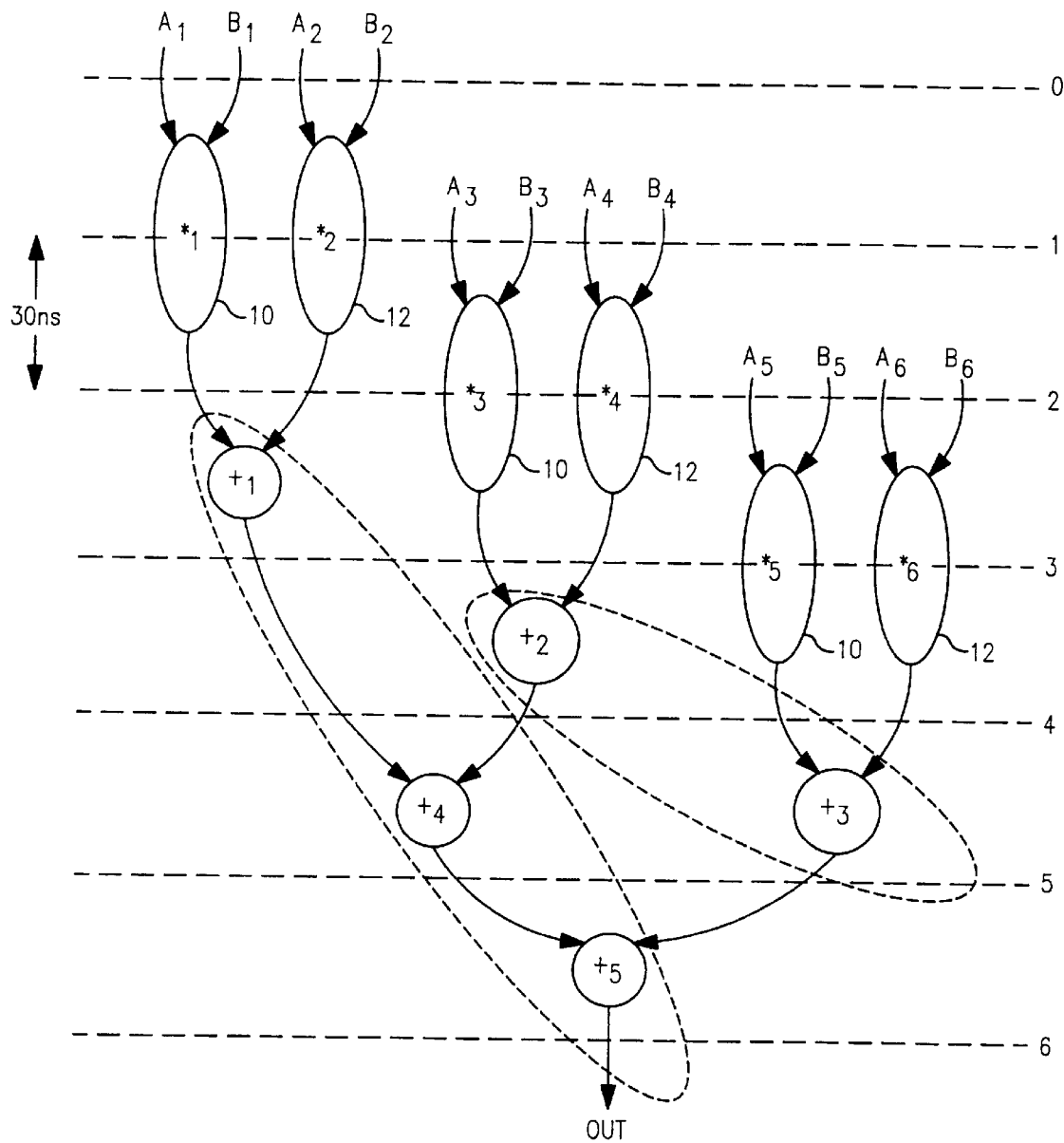
FIG. 6 is an alternative CDFG, showing a schedule, clock selection, module selection, and resource assignment changed from FIG. 1.

The CDFG of FIG. 1, with a different schedule, clock selection, module selection, and resource assignment is shown in FIG. 6, where multiplications are performed by two-stage pipelined multipliers and the schedule is elongated to reduce the number of required multipliers to two. The multiplication operations are assigned to separate multipliers; that is, operations *1, *3, and *5 are performed by multiplier 10, and operations *2, *4, and *6 are performed by multiplier 12. Two functional units of type ripple carry adder are used to perform the addition operations +1 to +5. The clock period is changed to 30 ns to match the cycle time of the pipelined multiplier. Because the schedule has been extended to use fewer functional units, processing each input sample now requires 180 ns. As a result, $V_{dd}$ can only be scaled to 4.5V. In terms of $V_{dd}$, the architecture implied by FIG. 1 is better. To compare the actual power dissipation, however, switched capacitance for the two architectures was also measured. Layouts were first generated for the two candidate architectures, netlists annotated with resistances and capacitances were then extracted from the layouts, and a switch-level simulator was used to simulate the two netlists for the same input sequence. The switched capacitance per sample period obtained for the implementations of FIGS. 1 and 6 were 2912.9 pf and 2100.6 pf, respectively. From the switched capacitance and $V_{dd}$ numbers, the energy per sample period was calculated to be 23,303 pJ and 21,269 pJ, respectively (the power dissipation can be obtained by dividing these numbers by the sample period of 200 ns). Therefore, the architecture derived from FIG. 6 has a lower power consumption than the one derived from FIG. 1.

Example 3 illustrates the importance of considering the effects of the different behavioral synthesis tasks on both $V_{dd}$ and switched capacitance to truly minimize power consumption.

B. Resource Sharing. Resource sharing refers to the use of the same hardware resource (functional unit or register) to perform different operations or store more than one variable. The behavioral synthesis tasks that perform resource sharing are hardware allocation and assignment. These processes decide how many resources of each type to use and which operations or variables to assign to each unit, respectively. Resource sharing significantly affects both the physical capacitance and switching activity in the data path. Heavy resource sharing tends to reduce the physical capacitance but increase the average switching activity in the data path. Sparsely shared architectures have lower average switching activity but higher physical capacitance.

Resource sharing moves can merge two functional units $fu_1$ and $fu_2$ into a single functional unit fU (if fU performs the operations performed by $fu_1$ as well as $fu_2$). For such a move to be valid, $fu_1$ and $fu_2$ must be instances of the same library template. Moreover, no operation performed by $fu_1$ should have an overlapping lifetime with an operation performed by $fu_2$. If the second condition is not met, the method attempts to find a rescheduling by the method described above.

EXAMPLE 4

Figure 7:
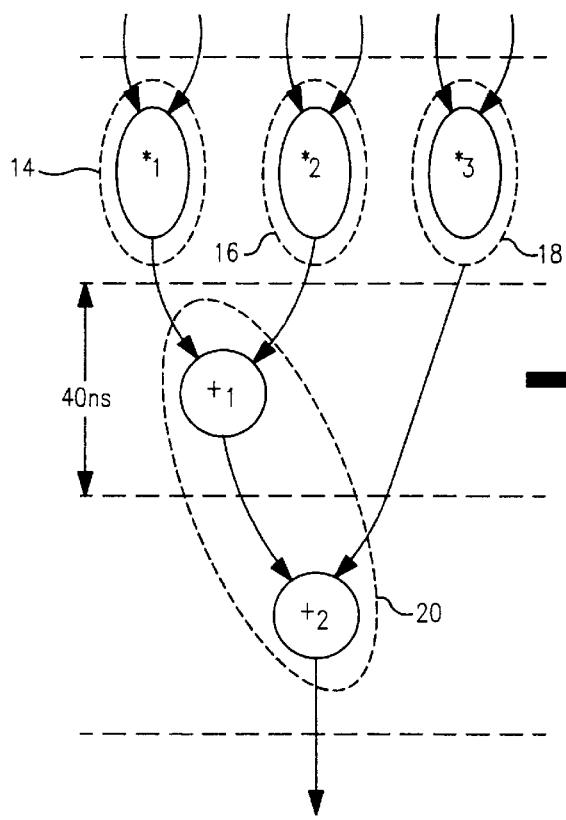
FIG. 7 is another example CDFG.
Figure 8:
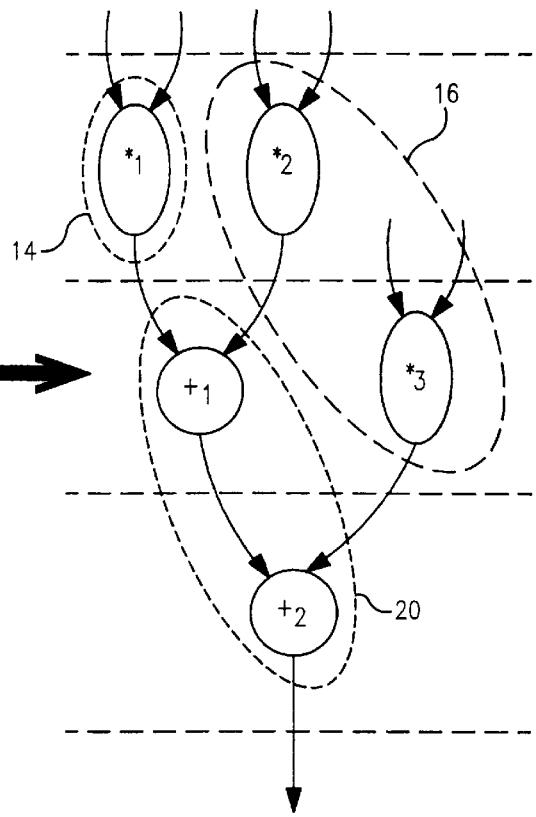
FIG. 8 is the CDFG of FIG. 7 with a different resource sharing, resulting in a new data path.

Consider the CDFG shown in FIG. 7. Each multiplication operation is performed by a separate multiplier, indicated as 14, 16, and 18; the two addition operations are mapped to one functional unit 20; and each variable is stored in a separate register. One possible resource sharing move can be applied to result in a new data path, as indicated by FIG. 8. Operation *3 had to be rescheduled from the first control step to the second control step to enable resource sharing of multiplier 16, which now performs both operation *2 and operation *3. It is important to note that this move causes two additional multiplexers to be added at the inputs of multiplier 16, because it now has to select from different sources in the first and second control steps. Hence, switched capacitance estimates for these multiplexers must be taken into account while calculating the gain for this move.

The reverse of resource sharing is resource splitting, i.e., a single functional unit fU is replaced with two functional units, $fu_1$ and $fu_2$. Resource splitting moves do not require any rescheduling transformations. Apart from potentially reducing switched capacitance, such moves also open up avenues for applying module selection moves, or other resource sharing moves that were not previously possible.

C. Module Selection. Module selection refers to the process of selecting, for each operation in the CDFG, the type of functional unit that will perform it.

It is possible to perform area, delay, and power tradeoffs using module selection. The faster modules that perform an operation are typically more expensive in terms of area and switched capacitance. However, using faster modules can result in a faster execution time for the CDFG, thus enabling $V_{dd}$ scaling.

Module selection interacts with clock selection, scheduling, and resource sharing. In the example of FIG. 1, a clock period of 55 ns was chosen based on the delay of the multiplication operations that were assigned to library template array multiplier. In FIG. 6, since the module selection was changed, the clock period was also changed to 30 ns, based on the cycle time of the template two-stage pipelined multiplier.

Operations that have been assigned to different functional unit templates during module selection cannot share the same resource. This situation is referred to as a type conflict. The inventive system considers the effect of these interactions while synthesizing the data path.

Module selection moves transform the data path by replacing a functional unit $fu_1$ that is an instance of a library template $t_1$, with another functional unit $fu_2$ that is an instance of a different library template $t_2$ (e.g., an adder that is an instance of carry lookahead adder may be replaced with an instance of ripple carry adder). Note that a rescheduling might be needed because the delay of $fu_2$ (in terms of number of control steps) could in general be greater than that of $fu_1$.

The rescheduling is performed as follows: Process operations $op_1, op_2, \ldots, op_n$ that were performed by $fu_1$ in that order, in the original schedule. For $op_i$, first increment the death time of $op_i$ to reflect the delay of $fu_2$. A breadth-first traversal of the CDFG is then performed starting at $op_i$, to update the scheduling information of the operations that are in the transitive fanout of $op_i$. After the above process has been performed for $op_n$, if all operations in the CDFG complete before the sample period, the process is complete. Otherwise (if the sample period constraint is violated), the move is not considered.

It is easy to extend this method to allow the sample period constraint to be violated by intermediate solutions, provided the final solution of the iterative improvement phase meets it.

EXAMPLE 5

Figure 9:
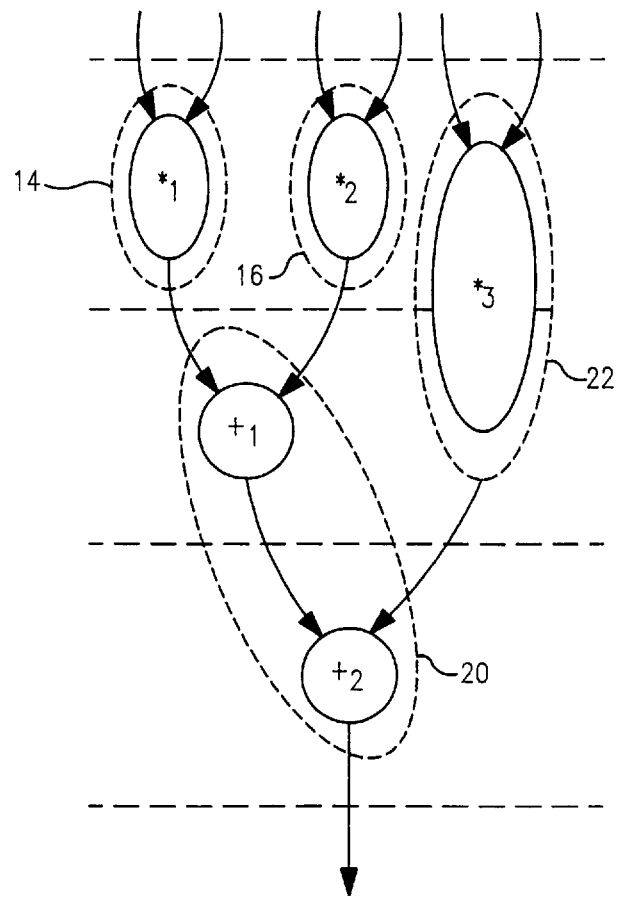
FIG. 9 is the CDFG of FIG. 7 with a different module selection, resulting in a new data path.

Consider the CDFG shown in FIG. 7. All multiplications are performed by instances of the library template wallace tree multiplier (14, 16, and 18), whereas all additions are performed by instances of ripple carry adder (20). A module selection move can be applied to result in a modified data path as indicated by FIG. 9. In the modified data path, multiplication operation *3 is instead performed by array multiplier 22, which requires two control steps. Because *3 has a mobility of one control step, the total number of control steps in the schedule remains the same.

Module selection moves directly help lower the switched capacitance when faster functional units (that typically cause a large amount of switched capacitance) are replaced by slower functional units that have a lower switched capacitance. Module selection moves can also help to indirectly lower switched capacitance when they are used to enable other moves, including those that perform resource sharing.

D. Selection of clock period and voltage.

A preferred embodiment can evaluate clock period/supply voltage combinations and select the pair that has the preferred, lowest switched capacitance. Alternatively, these parameters may be fixed, and the inventive method and system used only to choose the best arrangement of resources and schedule for the CDFG.

Clock selection refers to the process of choosing a suitable clock period for the controller/data path circuit. Given the clock period, $T_{clk}$, divide the execution time of the CDFG, which is equal to the input sample period, $T_{sample}$ into a number of control steps equal to $\lfloor T_{sample}/T_{clk} \rfloor$, where $\lfloor x \rfloor$ denotes the largest integer smaller than or equal to x. The choice of the clock period is known to have a significant effect on both area and performance. However, its impact on power consumption was pointed out only recently.

Once a clock period is chosen, calculate the delay of each functional unit template in the library in terms of control steps. Because this calculation involves the upward rounding of a fraction, a slack is introduced between the time at which a functional unit finishes executing and the clock edge at which its output is actually used. For example, for the CDFG of FIG. 6, the clock period is 30 ns. Assuming each addition operation requires 25 ns, including estimates for register, multiplexer and interconnect delays, a slack of 5 ns is introduced at every addition operation.

The slack introduced due to the clock granularity can result in less-than-complete utilization of the functional units, and could also result in an increase in the time required for the execution of the CDFG. In the context of minimizing power dissipation, slacks can cause two undesirable effects. First, it may not be possible to meet the sample period constraint for the CDFG for some values of $V_{dd}$. Second, slacks can result in a data path with a higher switched capacitance (this can happen either because faster functional units were used to meet the sample period, or because resource sharing was inhibited due to the increased life times of operations in the CDFG). Thus, reducing slacks is beneficial even from the power consumption point of view.

It might at first appear that, because slacks are caused by a granularity in the clock period, having a very small clock period would minimize the slack and is hence advantageous. However, having a very small clock period tends to significantly increase the switched capacitance in the data path registers (because they are clocked a greater number of times per execution period), the clock distribution network (because it needs to be switched a greater number of times), and the controller (because the number of states in the controller increases with the number of control steps). Due to these complicating factors, methods that solely target slack minimization are not directly applicable when minimizing power consumption is the objective. For reducing power consumption, slacks need to be minimized without choosing too small a clock period.

Clock Period Pruning. In the described preferred embodiment, the following observation can be used advantageously to prune the clock period space:

Given a desired sampling period $T_s$, it is sufficient to consider those clock periods $T_{clk}$ that satisfies $T_{clk}*i=T_s$ for some integer i (any other clock period would result in some part of T being unused). The practical lower bound on the clock period coupled with this observation itself restricts the set of candidate clock periods to a very limited set. This set can be further pruned as follows: Consider two candidate clock periods, $T_{clk1}$ and $T_{clk2}$ such that $T_{clk1}<T_{clk 2}$. For each functional unit template t in the data path library, let rrdelay$_t$ represent its register-to-register transfer delay. If the following equation holds $$\lceil rrdelay_t/T_{clk1}\rceil=\lceil rrdelay_t/T_{clk2}\rceil \; \forall \; \text{templates t,} \quad (3)$$

then it is sufficient to consider only $T_{clk1}$ while searching for the minimum switched capacitance data path at the current $V_{dd}$ (because any data path synthesized to operate at $T_{clk2}$ will also operate at $T_{clk1}$, whereas $T_{clk1}$ could allow us to synthesize data paths that would not satisfy the sample period constraint at $T_{clk2}$).

If operation chaining is employed with a maximum chaining factor of k (i.e. at most k operations can be chained together in a clock cycle), the condition of Equation (3) is checked not just for all functional unit templates in the library, but also for all chained combinations of up to k functional unit templates (note that the delay of chained configurations can be significantly less than the sum of delays of the chained components and should be measured separately for the various chained configurations possible).

Supply Voltage Pruning. The purpose of $V_{dd}$ pruning is to identify in advance candidate supply voltages that will not lead to a data path with the lowest power, permitting additional computational savings. The $V_{dd}$ pruning method of the preferred embodiment described herein is based on obtaining a lower bound on the switched capacitance for the current $V_{dd}$. A module selection is performed by mapping each operation in the CDFG to the functional unit template that has the lowest switched capacitance (this is determined using switched capacitance matrices). Even though such an implementation may violate the sample period constraint, this fact can be ignored to achieve a pessimistic estimate.

A parallel architecture (no sharing of functional units or registers) is then chosen to implement the data path. A parallel architecture is typically close to the lowest switched capacitance architecture, due to the high temporal correlations of signals characteristic of the digital signal and image processing domains. The switched capacitance of this implementation, multiplied by a pessimism factor ($0 \leq \lambda \leq 1$), is used to lower bound the power consumed by a data path at the current $V_{dd}$. If the bound thus calculated is greater than the best solution seen, then the current $V_{dd}$ can be pruned.

Experimental results, reported in Raghunathan & Jha, "An Iterative Improvement Algorithm for Low Power Data Path Synthesis," *Proc. IEEE Int'l Conf. on Computer-Aided Design* (Nov. 1995), which is hereby incorporated by reference, demonstrate the effectiveness of the method. On the average, circuits designed in accordance with the preferred method described above required up to six times lower power than the base case, while requiring area overheads ranging only up to 40% additional area. A specific computer program called "SCALP" implements an embodiment of the invention and is described in the article. An updated version of that program, using the same name described in the article, is in the microfiche appendix and is also incorporated herein by reference.

Although the invention has been described with reference to specific embodiments, many modifications and variations of such embodiments can be made without departing from the innovative concepts disclosed.

Unless specifically noted, it is intended that the words and phrases in the specification and claims be given the ordinary and accustomed meaning to those of ordinary skill in the applicable art or arts. If any other meaning is intended, the specification will specifically state that a word or phrase has a special meaning.

Likewise, any use of the word "function" in the specification, or any claim words that define or imply a function, is not intended to invoke the provisions of 35 U.S.C. § 112, ¶6 to define the invention. To the contrary, that paragraph will be considered to define a claimed element of the invention, only if the phrases "means for" or "step for" and a function, without also reciting in that element any structure, material, or act in support of the function, are specifically recited in that claim element. Moreover, even if the provisions of 35 U.S.C. § 112, ¶6 are invoked to define the invention, patentee intends that the invention not be limited to the specific structure, material, or acts that are described in the preferred embodiments. Rather, "means for" or "step for" elements are intended to cover and include within their scope any and all known or later-developed structures, materials, or acts that perform the claimed function, along with any and all equivalents.

Thus, it is understood by those skilled in the art that alternative forms and embodiments of the invention can be devised without departing from its spirit and scope. The foregoing and all other such modifications and variations are intended to be included within the spirit and scope of the appended claims.

We claim:

1. A process of high-level synthesis of a datapath from a behavioral specification performed on or with aid of a computer comprising:

(a) definining an initial design for a circuit by:

(i) defining an initial assignment of each of a set of operations defining a behavioral specification to one of a set of hardware resources;

(ii) defining an initial schedule of each of said set of operations to specified control steps subject to the constraints that:
  (A) no two operations assigned to a shared hardware resource can be scheduled to the same control step; and
  (B) the sum of the lengths of all control steps to which at least one of said operations is scheduled does not exceed a predetermined maximum; and
(iii) estimating the power consumed by each hardware resource to perform each operation assigned to it and summing said estimates;
(iv) identifying said sum as the lowest-power value;
(b) considering an alteration in the design of the circuit by:
  (i) proposing a move consisting of a power-reducing transformation;
  (ii) if required, rescheduling said set of operations to meet the constraints (A) and (B);
  (iii) if rescheduling is not necessary or a schedule can be found to meet the constraints, then repeating part (a)(iii) to create a new sum; and
  (iv) if the new sum is less than the lowest-power value, identifying the new sum as the lowest-power value;
(c) altering the design of the circuit by:
  (i) repeating part (b) for a variety of proposed moves;
  (ii) altering the circuit design by making the power-reducing transformation of the move associated with the lowest-power value; and
(d) iterating parts (b) and (c) using the altered circuit design until no proposed move results in a sum that is less than the lowest-power value.

2. The process of claim 1 further comprising selecting the move in part (b)(i) from several different types of power-reducing transformations.

3. The process of claim 2 wherein the move is selected from the set comprising resource sharing, resource splitting, and module selection.

4. The process of claim 3 wherein the set also includes clock selection and voltage selection.

5. The process of claim 4 wherein the set consists of resource sharing, resource splitting, module selection, clock selection, and voltage selection.

6. The process of claim 4 wherein the set also includes data path replication and CDFG transformation.

7. A process of high-level synthesis of a datapath from a behavioral specification, performed on or with aid of a computer, to define a low-power design for a computer circuit having a particular function, comprising:
(a) defining an initial assignment of each of a set of operations defining a behavioral specification to one of a set of hardware resources;
(b) defining an initial schedule of each of said set of operations to specified control steps subject to the constraints that:
  (i) no two operations assigned to a shared hardware resource can be scheduled to the same control step, and
  (ii) the sum of the lengths of all control steps to which at least one of said operations is scheduled does not exceed a predetermined maximum;
(c) estimating the power consumed by each hardware resource to perform each operation assigned to it and summing said estimates;
(d) identifying said sum as the lowest-power value;
(e) proposing a move consisting of reassigning one of said operations to a different one of the hardware resources;
(f) if any reassigned operation has been assigned to a hardware resource that is shared with any other operation scheduled to a control step to which the reassigned operation is also scheduled, then rescheduling said set of operations to meet the constraints in parts (b)(i) and (b)(ii);
(g) if rescheduling is not necessary or a schedule can be found to meet the constraints, then repeating part (c) to create a new sum;
(h) if the new sum is less than the lowest-power value, identifying the new sum as the lowest-power value; and
  (i) iterating parts (e) through (h) until no proposed move results in a sum that is less than the lowest-power value.

8. A process of high-level synthesis of a datapath from a behavioral specification performed on or with aid of a computer comprising:
(a) definining an initial design for a circuit by:
  (i) defining an initial assignment of each of a set of operations defining a behavioral specification to one of a set of hardware resources;
  (ii) defining an initial schedule of each of said set of operations to specified control steps subject to the constraints that:
    (A) no two operations assigned to a shared hardware resource can be scheduled to the same control step; and
    (B) the sum of the lengths of all control steps to which at least one of said operations is scheduled does not exceed a predetermined maximum; and
  (iii) estimating the power consumed by each hardware resource to perform each operation assigned to it and summing said estimates;
  (iv) identifying said sum as the lowest-power value;
(b) considering an alteration in the design of the circuit by:
  (i) proposing a move consisting of a power-reducing transformation;
  (ii) if required, rescheduling said set of operations to meet the constraints (A) and (B);
  (iii) if rescheduling is not necessary or a schedule can be found to meet the constraints, then repeating part (a)(iii) to create a new sum; and
  (iv) if the new sum is less than the lowest-power value, identifying the new sum as the lowest-power value;
(c) temporarily altering the design of the circuit by:
  (i) repeating part (b) for a variety of proposed moves;
  (ii) temporarily altering the circuit design by making the power-reducing transformation of the move associated with the lowest-power value; and
(d) determining an alteration in design of the circuit by:
  (i) repeating parts (b) and (c) a selected number of times, each time using the previously temporarily altered circuit design;
  (ii) before each repeat, saving the cumulative gain in power, measured as the difference between the power value of the design before any temporary alteration and the saved lowest-power value; and
  (iii) altering the circuit design by implementing the subsequence of temporary alterations in circuit design that has the highest cumulative gain in power; and
(e) iterating parts (b), (c), and (d) until no saved value of cumulative gain is positive.

9. The process of claim 8 further comprising selecting the move in part (b)(i) from several different types of power-reducing transformations.

10. The process of claim 9 wherein the move is selected from the set comprising resource sharing, resource splitting, and module selection.

11. The process of claim 10 wherein the set also includes clock selection and voltage selection.

12. The process of claim 11 wherein the set consists of resource sharing, resource splitting, module selection, clock selection, and voltage selection.

13. The process of claim 11 wherein the set also includes data path replication and CDPG transformation.

14. A computer reconfigured by a computer program to perform high-level synthesis of a datapath from a behavioral specification, to define a low-power design for a computer circuit having a particular function, comprising:

(a) a power-estimation module;

(b) a hardware-resource reassignment and rescheduling move generator; and (c) a multi-step, iterative power-minimization routine, coupled to the power-estimation module and the move generator.

15. A computer-readable storage medium storing a computer program to perform high-level synthesis of a datapath from a behavioral specification, to define a low-power design for a computer circuit having a particular function, comprising:

(a) a power-estimation module;

(b) a hardware-resource reassignment and rescheduling move generator; and (c) a multi-step, iterative power-minimization routine, coupled to the power-estimation module and the move generator.

* * * * *